Jan. 14, 1941. H. R. METZ 2,228,964
DIE HEAD FOR MACHINE TOOLS
Filed Oct. 2, 1939 2 Sheets-Sheet 1
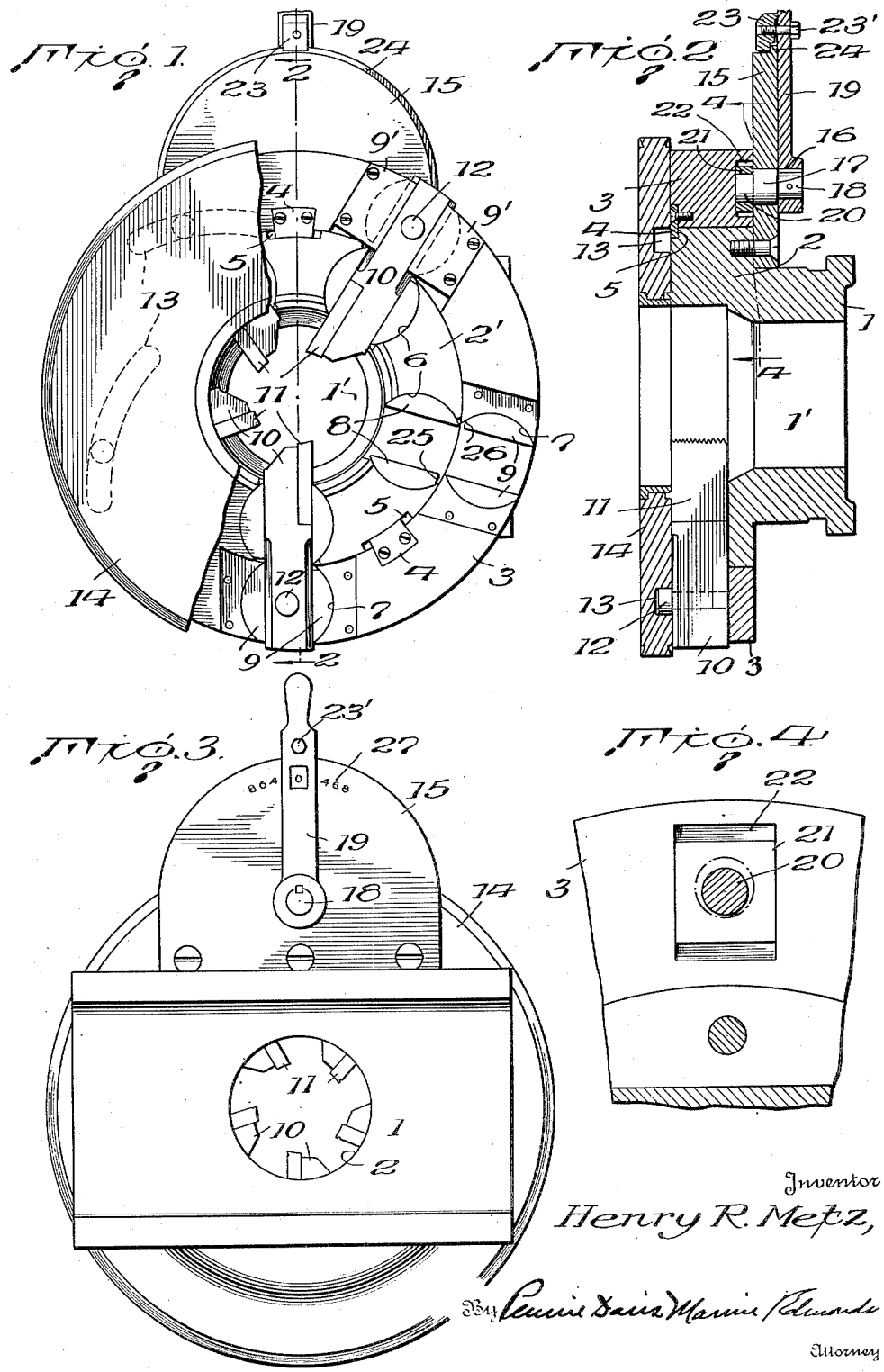
Inventor
Henry R. Metz,
Attorney Jan. 14, 1941.   H. R. METZ   2,228,964
DIE HEAD FOR MACHINE TOOLS
Filed Oct. 2, 1939   2 Sheets-Sheet 2
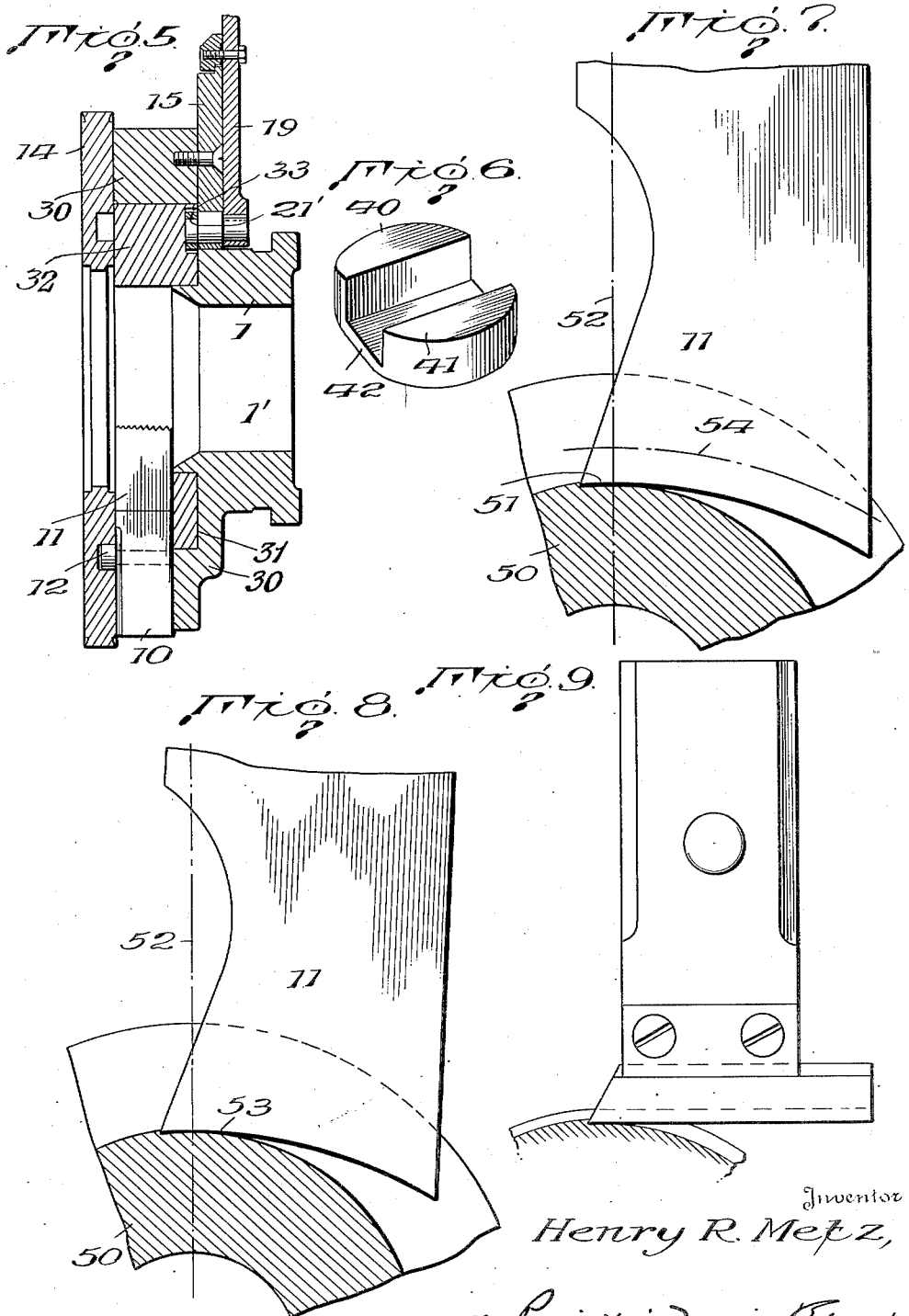
Inventor
Henry R. Metz, Patented Jan. 14, 1941

2,228,964

UNITED STATES PATENT OFFICE 2,228,964

DIE HEAD FOR MACHINE TOOLS

Henry Rex Metz, Richmond, Va.

Application October 2, 1939, Serial No. 297,572

11 Claims. (Cl. 10—100)

The present invention relates to an improved die head for machine tools, and particularly to a die head for the cutting dies or chasers of a thread-cutting machine.

In the cutting of threads on pipes, bolts and the like, a bearing effect of the die against the pipe or the like to give the squeeze to remove the necessary metal to form the threads should be substantially normal to a center line of the work beyond which the cutting edge of the die should extend a desired amount, usually approximately .030 of an inch for radial hobbed dies. The extent to which the cutting edge of the die extends beyond such a center line is referred to in the trade as the squeeze, or bearing, or support of the die. If the cutting die should be positioned so that there is no bearing effect or squeeze on the work the edge of the die would be doing all of the cutting and chattering would result.

At the present time it is customary to provide the die head of a thread cutting machine with a plurality of straight sided substantially radial slots into which the die holders which carry the die segments, or cutting dies are secured for radial movement so that threads may be cut on pipes of various sizes.

In the case of radial hobbed dies, that is, dies having the ends thereof adjacent the work outwardly concave, the bearing effect or squeeze of the die segments on the work has been extremely critical, and once established for a particular die could not be changed. For that reason it has been impossible to restore radial hobbed dies, as any grinding or other operation to restore the die segment would cause its bearing effect or squeeze on the work to be so altered that even if chattering did not result the cutting efficiency of the die would be greatly impaired. Also, at present it is necessary in using radial hobbed dies, if cutting efficiency is to be maintained, to use dies, the angles of inclination to the work, or rake, of which vary according to the nature of the metal of the pipe or rod being threaded. Thus, if a threading machine has been set up for threading iron pipe and it is desired to thread brass pipe, it is necessary to remove the dies from the holder and reset the machine with dies having the proper rake and squeeze for threading brass pipe. In accordance with the present invention the die holders for the die segments, whether radial hobbed, or tangential, are mounted in the die head so that their radial or substantially radial position may be varied in order that the squeeze and rake of the die segments may be readily and simply adjusted to give the desired squeeze and rake for the particular operation, regardless of whether or not the cutting die is of the radial hob type or of the tangential type, and also regardless of the particular metal from which the pipe or rod to be threaded is formed. Thus, the present invention permits radial hob dies to be restored and eliminates the necessity of resetting the machine with different dies when a change is to be made in the nature of the pipe or rod to be threaded, as from iron to brass. Also, the necessary adjustments may be made without disturbing the usual setting for pipe size.

More specifically, the present invention provides a die head having relatively movable portions in which the die holders are mounted so that as one portion is moved relative to the other the angular position of the die segments with respect to the work will be varied. Preferably, the die holders are mounted between pairs of segmental rocker blocks, or bearings in each of the relatively movable parts, with the arcs of the rocker blocks of each pair in each part having a common center so that as one part is moved relative to the other the rocker blocks may shift about their common centers so that no binding action on the die holders takes place.

The invention also contemplates a novel adjustment for the movable part of the die head so that it, and the dies carried thereby, may readily be adjusted to the desired angular position with respect to the work, regardless of whether the dies are of the right hand or left hand type.

The invention will be further described in connection with the accompanying drawings, but it is to be understood that such further illustration and description is by way of exemplification and that the invention is not limited thereto except as may be set forth in the appended claims.

In the drawings:

Fig. 1 is a face view of a die head embodying the present invention with a portion of the usual cam plate, and the operating means therefor, for moving the die holders inwardly and outwardly to adjust for pipe size, removed;

Fig. 2 is a sectional view on line 2—2, Fig. 1, but showing the cam plate for moving the die holders inwardly and outwardly in position;

Fig. 3 is a rear view of the die head shown in Fig. 1;

Fig. 4 is a sectional view on line 4—4, Fig. 2;

Fig. 5 is a sectional view similar to Fig. 2 showing a modification of the invention;

Fig. 6 is a detailed view showing a further modification;

Fig. 7 is a diagrammatic view showing the angular position of a new die segment to the work;

Fig. 8 is a view similar to Fig. 7 showing the angular position of the die segment to the work after the die segment has been restored after wear; and Fig. 9 is a view similar to Fig. 7 but showing a tangential die.

As shown in Figs. 1 to 4, the die head includes a central flanged hub 1 which may be secured, in the usual manner, to a power driven machine tool, as for example, a pipe or rod threading machine, and which has a central opening 1' through which one end of a pipe or rod to be threaded may extend. The hub 1 has an outwardly extending integral flange or ring 2 having a periphery which is circular and concentric with the axis of the hub 1 and about which an adjusting ring 3 is rotatably mounted. The adjusting ring 3 is held in place on the periphery of the flange 2 by suitable means, such as gibs 4 which are secured to the ring 3 and have their inner ends lying in an angular recess 5 in the outer face of the flange 2. The gibs 4 maintain the ring 3 on the flange while permitting free rotation of the ring by means hereinafter described.

The flange 2 is provided with a series of spaced, substantially circular recesses 6, and the adjusting ring 3 is provided with a series of similar recesses 7. The recesses in the flange 2 and in the rotatable ring are arranged in pairs, with each recess in the rotatable adjusting ring being in substantially radial alignment with its companion recess in the flange.

Spaced segmental bearing or rocker blocks 8 are positioned in opposite sides of the recesses in flange 2, and similar spaced bearing or rocker blocks 9 are positioned in opposite sides of the recesses of the rotatable adjusting ring 3. The outer rocker blocks may be held in proper position by end plates 9' set into the face of the adjusting ring 3. The spaces between the respective rocker blocks 8 and 9 align in a substantially radial direction to provide elongated substantially radial recesses for die holders 10 which have the die segments 11 secured in their inner ends.

The rocker blocks or bearing segments, if desired, may be made of steel and hardened and ground. If made of such hardened steel the rocker blocks will also act as liners for the slots for the die holders 10 and render the die head exceptionally serviceable as those slots then will be practically wear proof.

For adjusting the dies radially of the die head for threading pipes or rods of different diameters, the die holders 10 are provided with outwardly extending circular pins 12 which engage in eccentric cam grooves 13 in a cam or scroll plate 14. Suitable means not shown are provided for engaging the outer edge of the cam or scroll plate for rotating it to cause the cam grooves to move the dies inwardly and outwardly in making adjustments for pipe sizes, and for holding the cam plate in its adjustable position. Such means are well known and as they form no part of the present invention are not disclosed in the drawings.

A segmental plate 15 is secured to the rear face of the flange 2 and has a circular opening 16 forming a bearing for a trunnion 17. The trunnion has a pin 18 extending from the rear thereof to which an actuating handle 19 is keyed. An eccentric pin 20 extends from the opposite face of the trunnion 17 and is rotatably received in an opening in a bushing 21 located in a recess 22 in the rear face of the rotatable adjusting ring 3. The bushing 21 has a close fit with the sides of the recess 22 but is spaced from the upper and lower ends thereof to permit slight radial movement of the bushing. Thus, movement of the handle 19 will cause the trunnion to rotate within its bearing and to cause the eccentric pin 20 to actuate the bushing to rotate the adjusting ring 3 relative to the flange 2. A cleat 23 is secured to the upper end of the handle and overlies a flange 24 at the outer edge of the segmental plate in order to guide the handle as it is oscillated to adjust the ring 3. The cleat 23 is secured to the handle 19 by a bolt 23' so that by tightening the bolt the cleat will be clamped against the flange 24 and hold the handle 19 and the adjusting ring 3 against unintentional movement.

The arcs of the pairs of bearing or rocker blocks 6 in the flange 2, and the arcs of the pairs of bearing or rocker blocks 7 in the adjusting ring 3, respectively, have common centers so that when the ring 3 is rotated as above described the pairs of rocker blocks 6 will act as a pivot for the cutting dies. Consequently, when the ring 3 is rotated in a clockwise direction the die segments 11 carried at the inner ends each of the die holders 10 also move in a clockwise direction about an axis coinciding with the center of the arcs of the inner rocker blocks 6, and the die segments 11 will be adjusted in a counterclockwise direction with respect to the work. The fact that the respective arcs of the pairs of the rocker blocks have common centers prevents any binding of the blocks in the recesses or against the die shanks as the ring 3 is rotated to adjust the dies with respect to the work. To prevent the rocker blocks 6 and 7 from binding against one another, when they are located close to one another, or from binding against the hub 1, the ends thereof may be cut away as indicated at 25 and 26. As all of the shanks of the cutting dies are positioned between the rocker blocks in the flange 2 and the adjusting ring 3, rotation of the ring 3 will cause a simultaneous and equal adjustment for squeeze of all the die segments with respect to the work.

The eccentricity of the pin 20 is slight and the handle 19 is long so that the lever arm is short. Thus, a substantial movement of the handle will result in only a slight movement of the adjusting ring 3 and a slight movement of the cutting edge of the die segments with respect to the work. The extent to which the movement of the handle adjusts the cutting edge of the die segments to the work may be indicated in suitable units by a scale 27 formed on the face of the segmental plate 15. The scale 27 extends in both directions from a central point on the segmental plate because the means for adjusting the dies to the work, as above described, is equally adaptable to left hand cutting dies as to right hand cutting dies.

Preferably, the adjusting ring is located outwardly of the flange 2, as above described, because then the lever arms on opposite sides of the axis about which the dies oscillate will be more nearly equal, and the movement imparted to the cutting edge of the die segments will more nearly equal that imparted to the adjusting ring. However, in some instances it may be desirable to have the adjusting ring closer to the center of the work and to have the dies oscillate, during adjustment, about an axis located outwardly of the adjusting ring. Such an arrangement is shown in Fig. 5. In the construction shown in that figure the flange 30 of the central hub 1' is substantially wider and is provided with a concentric, angular recess 31 in its outer face for receiving the adjusting ring 32. The flange 30 is provided with a recess 33 adjacent the hub portion for receiving an adjusting bushing 21' like the bushing 21 of Fig. 2. The means for oscillating the adjusting ring 32 and for adjusting the radial position of the dies for pipe sizes is the same in this construction as in the corresponding means shown in Figs. 1 to 4, and like reference characters are used to designate similar parts.

The respective bearing or rocker blocks 6 of each pair, and the respective bearing or rocker blocks 7 of each pair, as shown in Figs. 1 and 2, are separate and independent of one another, but they may be formed integral as shown in Fig. 6, where they are formed as the legs 40 and 41 of a U-shaped cradle having a base 42 against which the die holders are held. The shape of the legs 40 and 41 and their movement as the ring 32 is rotated for adjustment is the same as the shape of the rocker blocks 6 and 7 of Figs. 1 and 2.

Fig. 7 diagrammatically indicates the position of a new radial hobbed die to a pipe 50 which is being threaded. It will be noted that the lower forward cutting edge 51 of the die segment 11 extends beyond the center line 52 and that the area of the bearing effect of the die against the pipe is substantially normal to that center line with the forward edge extending therebeyond a definite amount to give the desired squeeze. As previously indicated, the amount of the squeeze is critical and should not vary if maximum efficiency is to be maintained. However, in use, the die segment naturally wears and eventually becomes dull. Should the die segment, after such wear, be resharpened, the crest 53 thereof would be along a line somewhat corresponding to the broken line 54, in which case the squeeze would be reduced from that found to give maximum cutting efficiency, and the clearance between the rear end of the die segment and the work would be increased. With the present invention the die segment may be restored and the squeeze and clearance maintained at that which will give maximum cutting efficiency, merely by rotating the adjusting ring 3 in a clockwise direction until the die segment has assumed a position in which the squeeze and clearance is exactly what it was before the die was worn or restored. Also, any wearing of the die, before the die is restored, may be compensated for, in so far as squeeze is concerned, by movement of the adjusting ring clockwise to increase the squeeze.

In the figures of the drawings already discussed, the invention has been described in connection with radial hobbed dies. However, it is equally adaptable to tangential dies, as shown in Fig. 9, and also to circular dies. The use of a tangential die in place of a radial hobbed die in the present die head does not alter the use of a taper attachment for cutting a long thread with a narrow die.

From the foregoing description it will be seen that the present invention provides a simple effective arrangement whereby the squeeze or bearing effect of the die segment with respect to the work may at all times be so maintained that maximum cutting efficiency is obtained. Furthermore, the present invention eliminates the necessity for resetting the machine with different dies when changes in the nature of the work to be operated on are to be made.

I claim:

1. In a die head, means for retaining a die holder and die segment carried thereby in said die head comprising a plurality of die-holder-receiving members, one of which is movable relative to the other, each of said members having aligned, substantially radial recesses, rocker blocks oscillatably positioned in opposite sides of each of said recesses and adapted to receive a die holder between them, the outer surfaces of the rocker blocks in each of said recesses being arcuate and respectively having a common center, and means for moving said relatively movable member to impart a pivotal movement to the rocker blocks in the other member and to adjust the angular position of the die holder to the work.

2. In a die head, means for retaining a die holder and die segment carried thereby in said die head comprising a plurality of die-holder-receiving members, one of which is movable relative to the other, each of said members having aligned, substantially radial recesses, rocker blocks oscillatably positioned in opposite sides of each of said recesses and adapted to receive a die holder between them, the outer surfaces of the rocker blocks in each of said recesses being arcuate and respectively having a common center, and means for moving said relatively movable member to impart a pivotal movement to the rocker blocks in the other member and to adjust the angular position of the die holder to the work, said rocker blocks being of hardened steel and forming wear-resisting liners for said recesses.

3. In a die head, means for retaining a die holder and die segment carried thereby in said die head comprising a pair of concentric die-holder-receiving ring members having aligned recesses therein, substantially U-shaped oscillatable rocker blocks positioned in the recesses in said concentric ring members, said U-shaped rocker blocks being aligned and adapted to receive a die holder between the legs thereof, and means for moving one of said ring members relative to the other to impart a pivotal movement to the rocker blocks in the other ring member and to the die holder to adjust it angularly.

4. In a die head, means for retaining a die holder and die segment carried thereby in said die head comprising a pair of die-holder-receiving members, one of which is movable relative to the other, said movable member having circumferentially spaced portions, cam means engaging said circumferentially spaced portions, and means for actuating said cam means to move said relatively movable member relative to said other member to adjust the angular position of the die holder.

5. In a die head, means for retaining a die holder and die segment carried thereby in said die head comprising a pair of die-holder-receiving members, one of which is movable relative to the other, said movable member having a recess therein, a bushing in said recess, cam means engaging said bushing and means for actuating said cam means to cause the bushing to engage the sides of the recess in said movable member and to move said movable member relative to said other member to adjust the angular position of the die holder.

6. In a die head, a hub member having a central recess for work to be operated upon, a member mounted on said hub member and oscillatable relative thereto, said hub member and said oscillatable member each having means for receiving a die holder and a die segment carried thereby, the die-holder-receiving means on the hub and the die-holder-receiving means of the oscillatable member being aligned in a direction substantially radial to the recess in said hub member so that slight adjustments for clearance or squeeze may be effected independently of adjustments for size of thread without affecting the size of the thread, and means for oscillating said oscillatable member to vary slightly the clearance or squeeze of the die to the work.

7. In a die head, a hub member having a central recess for work to be operated upon, a member mounted on said hub member and oscillatable relative thereto, said hub member and said oscillatable member each having pivotal means for receiving a die holder and a die segment carried thereby, the die-holder-receiving means on the hub and the die-holder-receiving means of the oscillatable member being aligned in a direction substantially radial to the recess in said hub member so that slight adjustments for clearance or squeeze may be effected independently of adjustments for size of thread without affecting the size of the thread, and means for oscillating said oscillatable member to vary slightly the clearance or squeeze of the die to the work.

8. In a die head, a hub member having a central recess for work to be operated upon, a flange on said hub member having a circular periphery concentric with said recess, a ring member mounted on the periphery of said flange and oscillatable thereabout, said hub member and said oscillatable ring member each having pivotal means for receiving a die holder and a die segment carried thereby, the die-holder-receiving means of the hub member and the die-holder-receiving means of said oscillatable ring being aligned in a direction substantially radial to the recess in said hub member so that slight adjustments for clearance or squeeze may be effected independently of adjustments for size of thread without affecting the size of the thread, and means for oscillating said oscillatable ring to vary slightly the clearance or squeeze of the die to the work.

9. In a die head, a hub member having a central recess for work to be operated upon, an outwardly extending flange on said hub member, said flange having a circular recess in one face thereof, a ring member mounted in said recess and oscillatable relative to said hub member, said hub member and said oscillatable ring member each having pivotal means for receiving a die holder and a die segment carried thereby, the die-holder-receiving means of the hub member and the die-holder-receiving means of the oscillatable ring being aligned in a direction substantially radial to the recess in said hub member so that slight adjustments for clearance or squeeze may be effected independently of adjustments for size of thread without affecting the size of the thread, and means for oscillating said oscillatable member to vary slightly the clearance or squeeze of the die to the work.

10. In a die head, a hub member, a member mounted on said hub member and oscillatable relative thereto, said hub member and said oscillatable member each having means for receiving a die holder and a die segment carried thereby, the die-holder-receiving means on the hub and the die-holder-receiving means of the oscillatable member being aligned in a direction substantially radial to said hub member so that slight adjustments for clearance or squeeze may be effected independently of adjustments for size of thread without affecting the size of the thread, and means for oscillating said oscillatable member to vary slightly the clearance or squeeze of the die to the work.

11. In a die head, a hub member, a member mounted on said hub member and oscillatable relative thereto, said hub member and said oscillatable member each having pivotal means for receiving a die holder and a die segment carried thereby, the die-holder-receiving means on the hub and the die-holder-receiving means of the oscillatable member being aligned in a direction substantially radial to said hub member so that slight adjustments for clearance or squeeze may be effected independently of adjustments for size of thread without affecting the size of the thread, and means for oscillating said oscillatable member to vary slightly the clearance or squeeze of the die to the work.

HENRY REX METZ.